(12) United States Patent
Yamamoto et al.

(10) Patent No.: US 8,994,984 B2
(45) Date of Patent: Mar. 31, 2015

(54) INFORMATION PROCESSING APPARATUS, IMAGE FORMING APPARATUS, AND IMAGE PROCESSING METHOD

(75) Inventors: Hideaki Yamamoto, Kanagawa (JP); Tetsuya Satoh, Miyagi (JP)

(73) Assignee: Ricoh Company, Limited, Tokyo (JP)

( * ) Notice: Subject to any disclaimer, the term of this patent is extended or adjusted under 35 U.S.C. 154(b) by 829 days.

(21) Appl. No.: 12/793,260

(22) Filed: Jun. 3, 2010

(65) Prior Publication Data
US 2010/0322646 A1 Dec. 23, 2010

(30) Foreign Application Priority Data
Jun. 17, 2009 (JP) ................. 2009-144427

(51) Int. Cl.
| G06F 15/00 | (2006.01) |
| H04N 1/32 | (2006.01) |
| G03G 15/01 | (2006.01) |
| G03G 15/00 | (2006.01) |
| H04N 1/36 | (2006.01) |

(52) U.S. Cl.
CPC ........... *H04N 1/32561* (2013.01); *G03G 15/01* (2013.01); *G03G 15/50* (2013.01); *H04N 1/32582* (2013.01); *H04N 1/32603* (2013.01); *H04N 1/36* (2013.01); *H04N 2201/0082* (2013.01)
USPC ........... 358/1.15; 345/204; 347/247; 713/375

(58) Field of Classification Search
USPC ........................................... 358/1.15
See application file for complete search history.

(56) References Cited

U.S. PATENT DOCUMENTS

| 5,006,979 | A | * | 4/1991 | Yoshie et al. | ............... 713/375 |
| 6,008,913 | A | * | 12/1999 | Yoshida | ............... 358/529 |
| 2005/0264646 | A1 | * | 12/2005 | Izumiya et al. | ............... 347/243 |
| 2008/0143814 | A1 | * | 6/2008 | Masui et al. | ............... 347/249 |
| 2009/0066676 | A1 | * | 3/2009 | Jo | ............... 345/204 |
| 2009/0322398 | A1 | * | 12/2009 | To et al. | ............... 327/292 |

FOREIGN PATENT DOCUMENTS

| JP | 2005-186530 | 7/2005 |
| JP | 2006-12363 | 1/2006 |

* cited by examiner

*Primary Examiner* — Ashish K Thomas
*Assistant Examiner* — Mark Milia
(74) *Attorney, Agent, or Firm* — Oblon, McClelland, Maier & Neustadt, L.L.P.

(57) ABSTRACT

An information processing apparatus includes a plurality of output circuits that output a plurality of pieces of information to an external device. Each of the output circuits includes a synchronization control unit that synchronizes an operation clock of the output circuit with an operation clock of a separate output circuit; an information receiving unit that receives a piece of information that is different from a piece of information that is received by the separate output circuit; and an output control unit that outputs the received piece of information to the external device in accordance with the synchronized operation clock.

4 Claims, 5 Drawing Sheets

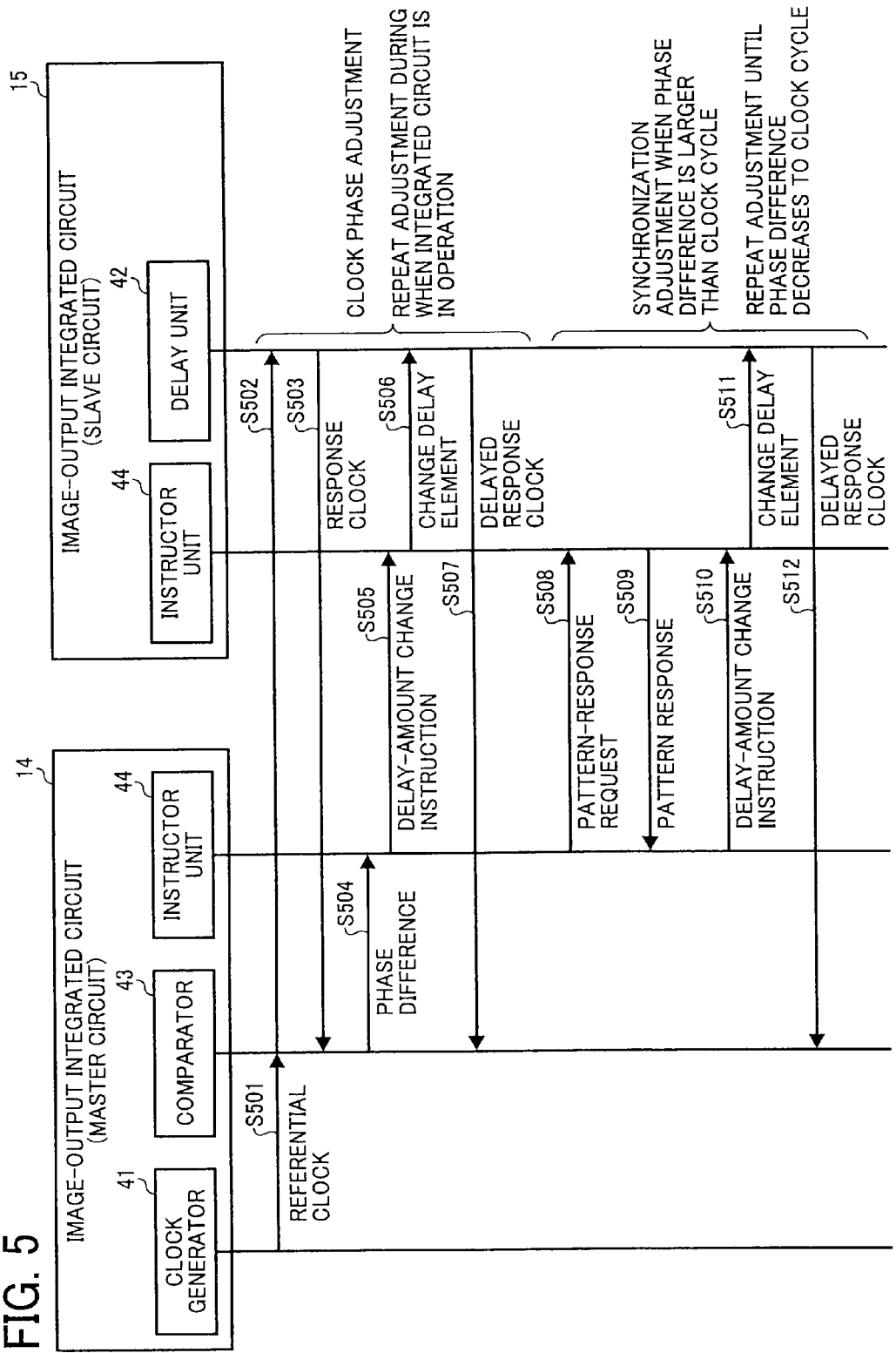

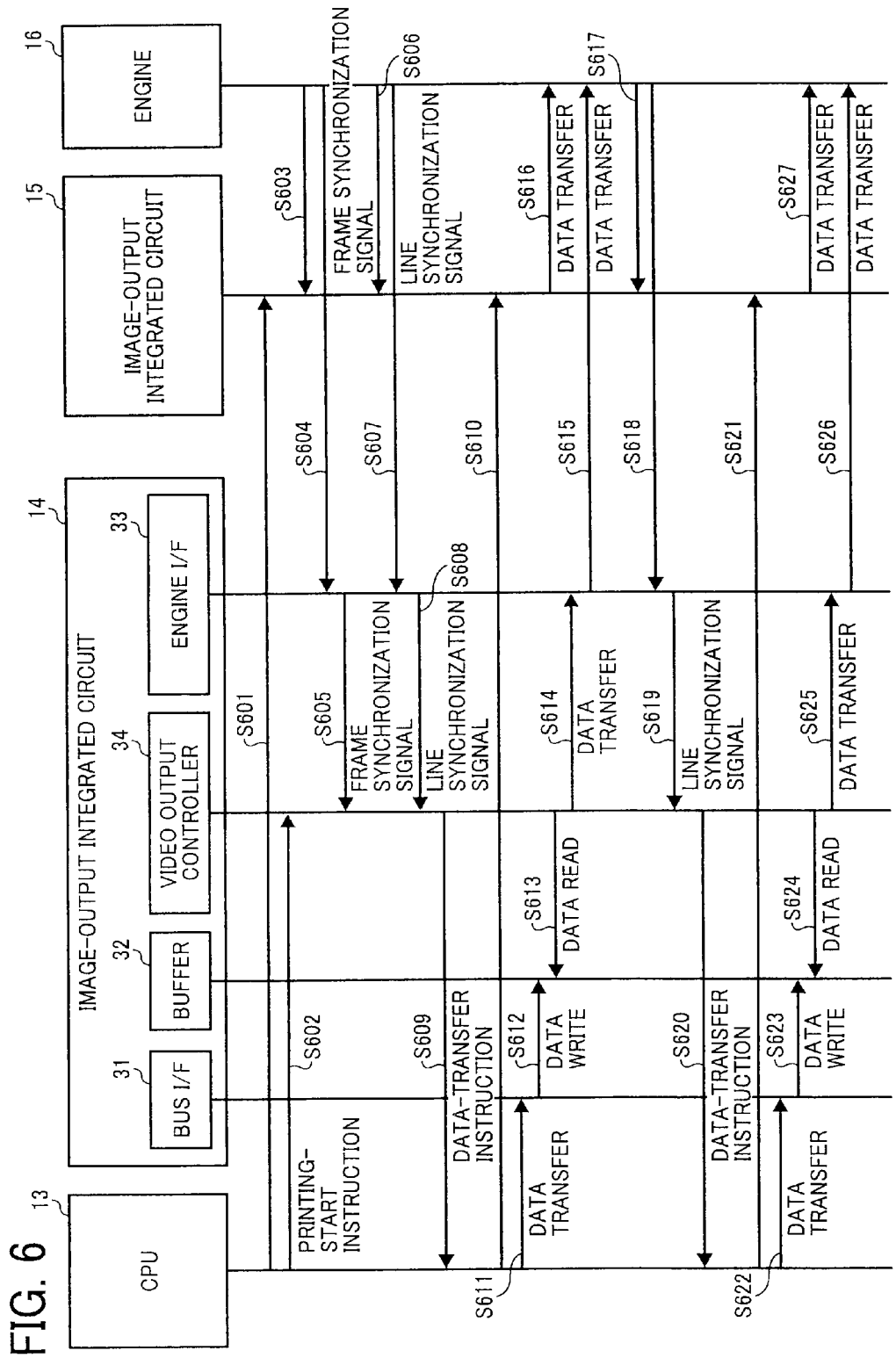

INFORMATION PROCESSING APPARATUS, IMAGE FORMING APPARATUS, AND IMAGE PROCESSING METHOD

CROSS-REFERENCE TO RELATED APPLICATIONS

The present application claims priority to and incorporates by reference the entire contents of Japanese Patent Application No. 2009-144427 filed in Japan on Jun. 17, 2009.

BACKGROUND OF THE INVENTION

1. Field of the Invention

The present invention relates to an image processing apparatus, an image forming apparatus, and an information processing method.

2. Description of the Related Art

When, in an electrophotographic image forming apparatus, an integrated circuit transfers data to an engine unit, the integrated circuit needs to transfer the data in response to a horizontal synchronization signal received from the engine unit in a highly accurate manner. According to the demand for higher printing quality, image forming apparatuses with a large number of toner colors and a high resolution are produced, which increases the amount of necessary data and leads technologies that solve problems accompanying with the increased amount of data.

To transfer data (image data) of multicolor image at high speed, as described above, it is necessary to synchronize a plurality of outputs containing the image data in a highly accurate manner. Japanese Patent Application Laid-open No. 2005-186530 discloses a technology that synchronizes, using a delay generator circuit and a decision circuit, the outputs containing the image data with the horizontal synchronization signal received from the engine unit at a resolution higher than or equal to that of the main clock. This technology can reduce jitter due to the mechanical structure and jitter that is peculiar to analog data while suppressing an increase in the manufacturing costs. A delay-locked loop (DLL) circuit, which is a method of signal synchronization, is known and disclosed in Japanese Patent Application Laid-open No. 2006-012363.

However, with the conventional method, if, in an external device that receives data from the integrated circuit, the number of pieces of data to be processed by the external device increases, it is difficult to operate the integrated circuit appropriately in accordance with the increase in the number of pieces of data. For example, if a greater number of toners colors are used in the image forming apparatus, it is necessary to design, in accordance with the increase in the number of toner colors, a new dedicated integrated circuit (application specific integrated circuit (ASIC)) to transfer the image data to the external device.

SUMMARY OF THE INVENTION

It is an object of the present invention to at least partially solve the problems in the conventional technology.

According to an aspect of the present invention, there is provided an information processing apparatus includes a plurality of output circuits that output a plurality of pieces of information to an external device. Each of the output circuits includes a synchronization control unit that synchronizes an operation clock of the output circuit with an operation clock of a separate output circuit; an information receiving unit that receives a piece of information that is different from a piece of information that is received by the separate output circuit; and an output control unit that outputs the received piece of information to the external device in accordance with the synchronized operation clock.

According to another aspect of the present invention, there is provided an image forming apparatus includes an image forming unit that forms an image on the basis of color image information; and a plurality of output circuits that output to the image forming unit a plurality of pieces of color information each indicating image information on a different color contained in the color image information. Each of the output circuits includes a synchronization control unit that synchronizes an operation clock of the output circuits with an operation clock of a separate output circuit; an information receiving unit that receives a piece of color information that is different from a piece of color information that is received by the separate output circuit; and an output control unit that outputs the received piece of color information to the external device in accordance with the synchronized operation clock.

According to still another aspect of the present invention, there is provided an information processing method performed by a plurality of output circuits that output a plurality of pieces of information to an external device. The information processing method includes synchronizing, by a synchronization control unit of a first output circuit, a first operation clock of the first output circuit with a second operation clock of a second output circuit; receiving, by an information receiving unit of the first output circuit, a first piece of information that is different from a second piece of information that is received by the second output circuit; and outputting, by an output control unit of the first output circuit, the received first piece of information to the external device in accordance with the synchronized first operation clock.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 is a general sequence of a synchronization control process according to the present embodiment; and FIG. 6 is a general sequence of an image transfer process according to the present embodiment.

DETAILED DESCRIPTION OF THE PREFERRED EMBODIMENTS

Exemplary embodiments of an image forming apparatus according to the present invention are described in detail below with reference to the accompanying drawings. In the following description, the image forming apparatus is, for example, a printer, a scanner, a facsimile machine, etc. The image forming apparatus can be any information processing apparatus that can output data to an external device that can process a plurality of pieces of data. The image forming apparatus can be, for example, a multifunction product that has two or more functions selected from the copy function, the printer function, the scanner function, and the facsimile function.

Figure 1:
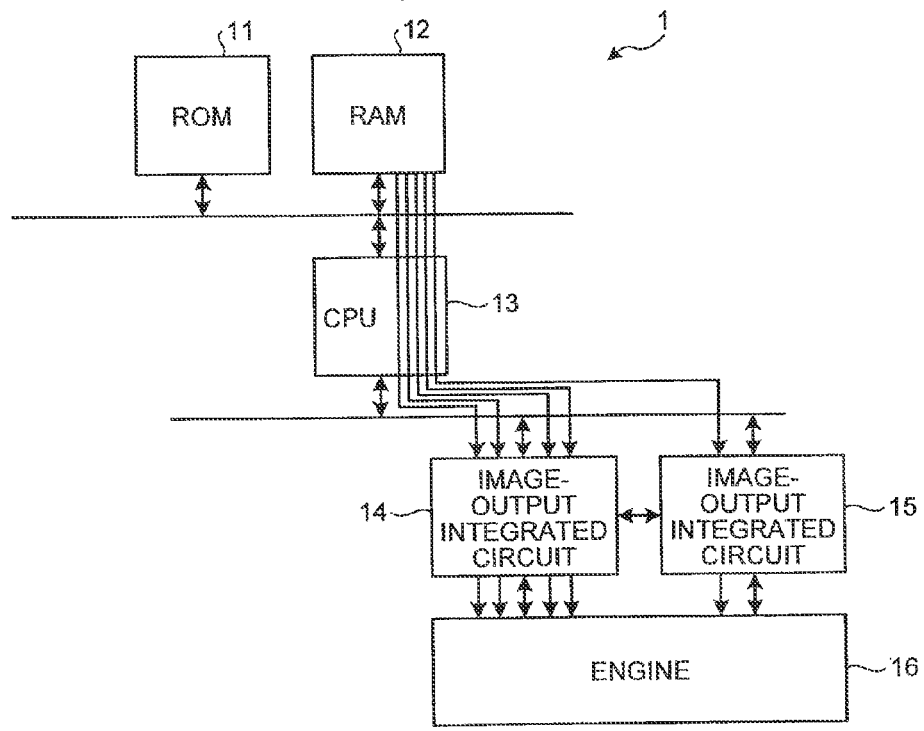
FIG. 1 is a block diagram of the hardware configuration of an image forming apparatus according to a present embodiment.

FIG. 1 is a block diagram of the hardware configuration of an image forming apparatus 1 according to a present embodiment. As shown in FIG. 1, the image forming apparatus 1 includes a ROM 11, a RAM 12, a CPU 13, image-output integrated circuits 14 and 15, and an engine 16.

The ROM 11 is a read only memory that stores therein computer programs and data. The RAM 12 is a readable and writable memory that loads thereon the computer programs and data or printer graphics data.

The CPU 13 loads various control programs on the RAM 12 and executes the control programs, thereby performing various processes. Thus, the CPU 13 controls the image forming apparatus 1.

The image-output integrated circuits 14 and 15 are ASICs that output image data to the engine 16 in response to an instruction received from the CPU 13. The image-output integrated circuits 14 and 15 can be configured to receive image data from another higher-level ASIC (not shown) and output the received image data to the engine 16.

As the bus that connects the image-output integrated circuits 14 and 15 and the CPU 13 or the higher-level ASIC, a high-speed PCI Express-compliant bus that is allocated to a port dedicated to each integrated circuit is preferable.

The image-output integrated circuits 14 and 15 can be configured to be connected to those units (not shown in FIG. 1), such as a hard disk drive (HDD) and an IEEE 1394 (the Institute of Electrical and Electronics Engineers 1394) interface.

The engine 16 is, for example, a printer engine connectable to a bus, such as a PCI Express-compliant bus. The engine 16 is, more particularly for example, a black-and-white plotter, a single-drum color plotter, a four-drum color plotter, a scanner, a facsimile unit, or the like. The engine 16 includes not only a so-called engine unit, such as a plotter, but also an image processing unit that performs error diffusion, gamma conversion, etc.

Figure 2:
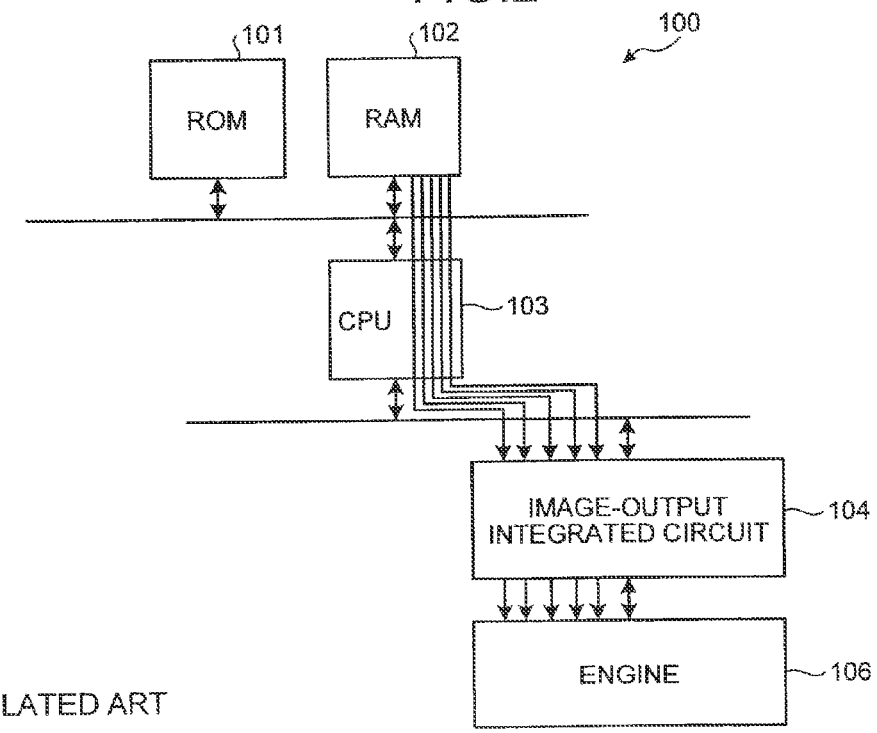
FIG. 2 is a block diagram of the hardware configuration of a conventional image forming apparatus.

The difference between the image forming apparatus 1 and a conventional image forming apparatus is described below. FIG. 2 is a block diagram of the hardware configuration of a conventional image forming apparatus 100. FIG. 2 includes a ROM 101, a RAM 102, and a CPU 103. As shown in FIG. 2, the conventional image forming apparatus 100 includes one image-output integrated circuit 104. This is because the configuration is effective at outputting pieces of image data on various colors in a highly synchronized manner. If the single image-output integrate circuit operates in accordance with a single operation clock and outputs pieces of data on various colors, it is expected, in general, that the pieces of data on various colors are output in a highly synchronized manner.

The conventional image forming apparatus 100 shown in FIG. 2 includes one image-output integrated circuit that transfers pieces of data on five colors to an engine 106. With this configuration, if a greater number of toner colors are processed by the engine 106, it is necessary to design a new image-output integrated circuit.

The image forming apparatus 1 according to the present embodiment, in contrast, includes the two similar image-output integrated circuits 14 and 15, as shown in FIG. 1. If the engine 16 handles five different toner colors, it is configured, for example, to output four of the colors from the image-output integrated circuit 14 and the remaining one color from the image-output integrated circuit 15.

With this configuration, the engine 16 can have the same design as an engine that receives data from one integrated circuit. If each of the image-output integrated circuits 14 and 15 is an integrated circuit that can output up to four colors, the image forming apparatus 1 has the scalability that allows the engine 16 to be changed so that it can receive up to eight colors.

The upper limit of the number of pieces of data to be processed by each image-output integrated circuit can be less than or more than four. The number of image-output integrated circuits can be more than two. It is allowable to design the image-output integrated circuits in such a manner that the number of image-output integrated circuits changes appropriately. Even in such cases, as long as the image-output integrated circuits are configured to synchronize with each other, the image forming apparatus can operate appropriately in accordance with a change in the number of pieces of data to be processed by the engine 16 without requiring a newly designed integrated circuit.

The engine 16 can include two or more engines. For example, it is allowable to configure the image forming apparatus to include, as the engine 16, a plurality of engines with the same number of image-output integrated circuits in such a manner that each of the image-output integrated circuits outputs image data to the corresponding one engine of engine 16. This makes the engine 16 extensible in accordance with an increase in the number of colors without changing its hardware configuration.

As described above, in the present embodiment, when an image forming apparatus with multi-color toners is designed, two or more image-output integrated circuits that are connected to each other are used instead of a dedicated image-output integrated circuit that is designed in accordance with the number of colors. The integrated circuits perform highly accurate timing synchronization so that they operate together in an associated manner. Thus, the integrated circuits are designed so that they can operate appropriately in accordance with an increase in the number of colors.

When two or more image-output integrated circuits are used, it is necessary to output data from each of the image-output integrated circuits in a highly synchronized manner. High-speed printing, especially, requires highly accurate synchronization of the operation clocks. This is because inaccurate synchronization will bring jitter or the like, which reduces the printing quality.

Figure 3:
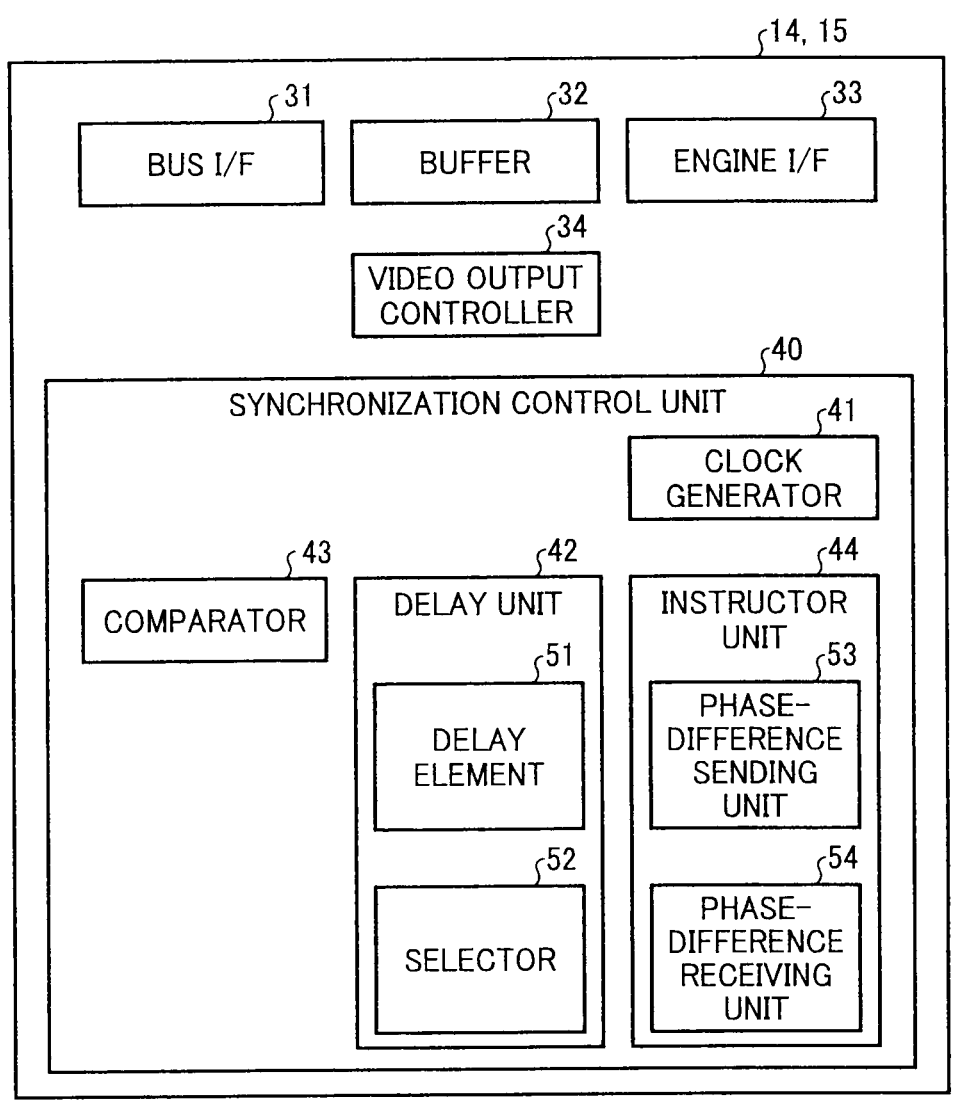
FIG. 3 is a detailed block diagram of an image-output integrated circuit.

In the present embodiment, each of the image-output integrated circuits is configured to synchronize its operation clock with the operation clock of another image-output integrated circuit. FIG. 3 is a detailed block diagram of the image-output integrated circuits 14 and 15. The image-output integrated circuits 14 and 15 have the same configuration; therefore, only the image-output integrated circuit 14 is described below.

As shown in FIG. 3, the image-output integrated circuit 14 includes a bus interface (I/F) 31, a buffer 32, an engine I/F 33, a video output controller 34, and a synchronization control unit 40.

The bus I/F 31 is a bus interface that connects the image-output integrated circuit 14 to the CPU 13 or a higher-level ASIC. The bus I/F 31 corresponds to an information receiving unit that receives image data. The bus I/F 31 is preferably, for example, a PCI express-compatible bus interface that can transfer image data.

The buffer 32 is a temporary memory that stores therein image data received from the CPU 13 or the higher-level ASIC via the bus I/F 31.

The engine I/F 33 is an interface that connects the image-output integrated circuit 14 to the engine 16.

The video output controller 34 corresponds to an output control unit that reads the image data from the buffer 32 and transfers the image data to the engine I/F 33 under timing control of a later-described instructor unit 44 of the synchronization control unit 40.

The synchronization control unit 40 synchronizes the operation clock of the image-output integrated circuit 14 with the operation clock of another image-output integrated circuit, such as the image-output integrated circuit 15. The synchronization control unit 40 includes a clock generator 41, a delay unit 42, a comparator 43, and the instructor unit 44.

The clock generator 41 generates a clock with which the operation clock of each image-output integrated circuit is synchronized (hereinafter, "referential clock"). The clock generator 41 is made up of a crystal oscillator, a phase-locked loop (PLL), etc. The image-output integrated circuit 14 can be configured to receive a clock that is generated by an external crystal oscillator or the like as the referential clock.

The frequency of the referential clock is set equal to the frequency of clocks that have been synchronized between the image-output integrated circuits (e.g., pixel-transfer synchronization clock). From the perspective of highly accurate synchronization, the frequency of the referential clock is preferably set higher, e.g., twice or four-times as high as the frequency of the clocks that have been synchronized between the image-output integrated circuits.

During a later-described clock synchronization process, the image-output integrated circuit that supplies the clock (hereinafter, "master circuit") needs different functions than an image-output integrated circuit that synchronizes its operation clock with the operation clock of the master circuit (hereinafter, "slave circuit") needs. In the present embodiment, all the image-output integrated circuits have the same functions. In other words, all the image-output integrated circuits have every function that the master circuit or the slave circuit needs. Therefore, any image-output integrated circuit can be the master circuit or the slave circuit. With this configuration, when two or more image-output integrated circuits that are the same type operate together in an associated manner, any of them can be set as the master circuit.

It is allowable to set a first image-output integrated circuit as the master circuit and a second image-output integrated circuit as the slave circuit and design the first and the second image-output integrated circuits to have the requisite minimum functions. For example, the clock generator 41 is required for only the master circuit. In this case, only the first image-output integrated circuit, which is set as the master circuit, includes the clock generator 41.

The delay unit 42 delays the phase of the operation clock received from the clock generator 41 so as to eliminate the difference between the phase of its operation clock and the phase of the operation clock of an image-output integrated circuit that is set as the master circuit. The delay unit 42 is needed for the image-output integrated circuit that is set as the slave circuit. The delay unit 42 includes a delay element 51 and a selector 52.

The delay element 51 includes a plurality of delay elements that are connected to each other in series. The delay element 51 delays the input operation clock. The delay time depends on the number of the individual delay elements 51 through which the signal has passed. In other words, the amount of delay of the signal is adjusted according to the number of the individual delay elements 51 through which the signal has passed. For example, as the number of the individual delay elements 51 through which the signal has passed increases, the amount of delay of the signal increases. As the number of the individual delay elements 51 through which the signal has passed decreases, the amount of delay of the signal decreases.

The selector 52 selects an appropriate signal from a plurality of delayed signals (operation clocks) different in delay amount that are produced by the delay element 51 and sends the selected signal to the comparator 43 of the master circuit. The selector 52 selects, in accordance with the instruction received from the instructor unit 44, the signal from the operation clocks received from the delay element 51 so as to eliminate the difference between the phase of its operation clock and the phase of the operation clock of the master circuit. However, because which signal is the appropriate one cannot be determined at the initial state, it is preferable to select a signal having an amount of delay lying at the center of the delay amount range. This is because, if a signal having a middle amount of delay is selected at the initial state, it is possible to either increase or decrease the amount of delay for adjustment.

The comparator 43 compares the referential clock that is generated by the clock generator 41 and the operation clock that is received from the selector 52 of an external image-output integrated circuit and detects the phase difference between them. The comparator 43 is preferably included in the image-output integrated circuit that is set as the master circuit. The comparator 43 has, for example, the same function as a phase detector in a PLL has. The comparator 43 sends the detected phase difference to the instructor unit 44.

The instructor unit 44 checks the phase difference received from the comparator 43 and instructs the delay unit 42 to delay the operation clock. The instructor unit 44 includes a phase-difference sending unit 53 and a phase-difference receiving unit 54.

The phase-difference sending unit 53 sends the phase difference received from the comparator 43 to the external image-output integrated circuit that is set as the slave circuit. Accordingly, the phase-difference sending unit 53 is needed for the image-output integrated circuit that is set as the master circuit.

The phase-difference receiving unit 54 receives the phase difference from the external image-output integrated circuit that is set as the master circuit. Accordingly, the phase-difference receiving unit 54 is needed for the image-output integrated circuit that is set as the slave circuit.

The phase-difference sending unit 53 and the phase-difference receiving unit 54 are connected to each other via a signal line that carries the phase difference.

In the image-output integrated circuit that is set as the slave circuit, the instructor unit 44 instructs the selector 52 to change the amount of delay in accordance with the received phase difference. For example, the instructor unit 44 calculates the number of the individual delay elements 51 through which the signal of the operation clock is to be passed to eliminate the received phase difference and instructs the selector 52 to select the signal that has passed the calculated number of the individual delay elements 51.

The synchronization control process performed by the synchronization control unit 40 is repeated over and over during when the image forming apparatus 1 is in operation. This is because the amount of delay due to the wires and the elements formed on the substrate or the semiconductor are always subjected to change because of heat generated mainly by nearby elements or the own element.

If the phase difference is larger than the clock cycle, the synchronization control unit 40 adjusts the phase difference by means of a pattern response. For example, the instructor unit 44 of the master circuit sends, to the instructor unit 44 of the slave circuit, a predetermined pattern instruction saying that, for example, "response four clocks later". In this example, the instructor unit 44 of the slave circuit sends a response signal four clocks later. The instructor unit 44 of the master circuit compares the expected point of time at which the response to the sent pattern will be received with the actual point of time at which the response is received from the instructor unit 44 of the slave circuit and determines whether the phase difference is larger than the clock cycle. The signal of the pattern response can be sent via the same signal line as the phase difference is sent or a different signal line.

Figure 4:
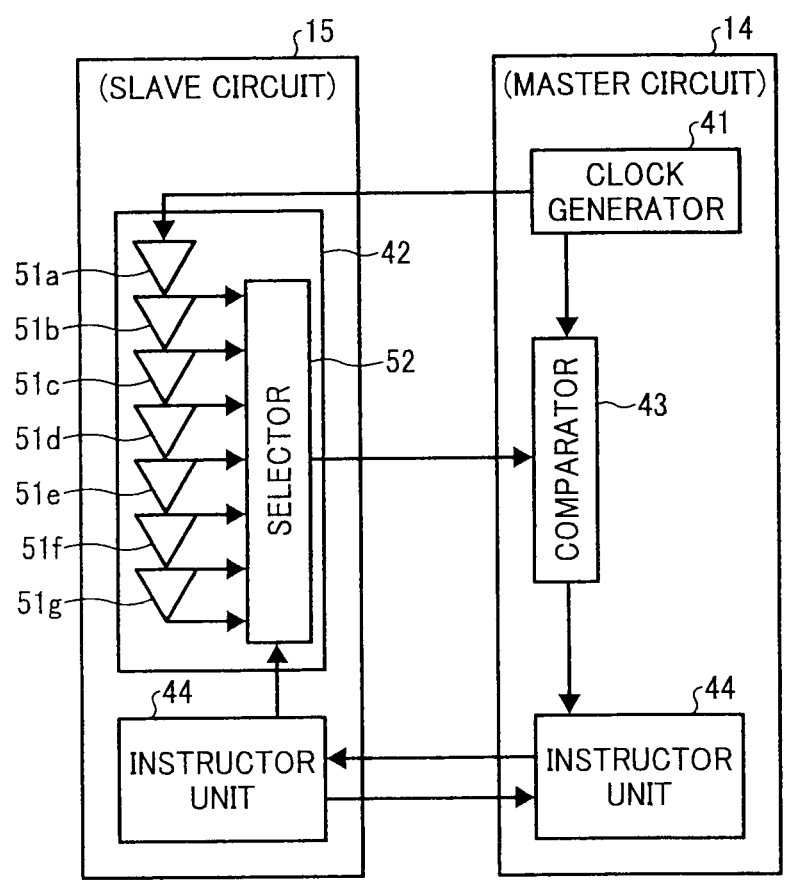
FIG. 4 is a block diagram of a master circuit and the slave circuit each including the necessary functions only.

The functions necessary for the master circuit and the functions necessary for the slave circuit to synchronize the plurality of the image-output integrated circuits are described below with reference to FIG. 4. FIG. 4 is a block diagram of the master circuit and the slave circuit each including the necessary functions only. In the example shown in FIG. 4, the image-output integrated circuit 14 shown in FIG. 1 is set as the master circuit and the image-output integrated circuit 15 shown in FIG. 1 is set as the slave circuit. Only the components necessary for the master circuit and the components necessary for the slave circuits are shown in FIG. 4. Although the delay element 51 shown in FIG. 4 includes seven delay elements 51a to 51g, the number of the individual delay elements 51 can be less than or more than seven.

As shown in FIG. 4, the image-output integrated circuit 14 that is set as the master circuit needs only the clock generator 41, the comparator 43, and the instructor unit 44. The image-output integrated circuit 15 that is set as the slave circuit needs only the delay unit 42 and the instructor unit 44.

In this manner, in order to correct the timing shift due to a delay in the circuit, the components of a DLL circuit that is used in, for example, a dynamic random access memory (DRAM) are arranged separately on the plurality of (two in the example) the image-output integrated circuits.

A memory controller of the DRAM includes all the components corresponding to those necessary for the master circuit and those necessary for the slave circuit shown in FIG. 4 (the clock generator 41, the delay unit 42, the comparator 43, and the instructor unit 44). The memory controller of the DRAM synchronizes data received from a memory module as a response using the mechanism of the DLL. In the present embodiment, in contrast with the structure of the DRAM or the like, the components that constitute the DLL are arranged separately on the two image-output integrated circuits that are set as the master circuit and the slave circuit, respectively.

As shown in FIG. 4, in order to synchronize the points of time at which image data is transferred from each of the two image-output integrated circuits to the engine 16, the two image-output integrated circuits are connected to each other via four signal lines. In the present embodiment, at least four signal lines are needed that includes a signal line that carries the referential clock, a signal line that carries the operation clock selected by the selector 52, a signal line that carries the detected phase difference or the pattern instruction, and a signal line that carries the response to the pattern instruction. With this configuration, according to the present embodiment, it is possible to synchronize the two image-output integrated circuits in a highly accurate manner using the small number of the signal lines.

Moreover, because the mechanism of the DLL circuit is taken into the method of synchronizing the two image-output integrated circuits according to the present embodiment, it is unnecessary to multiply the clock of the master circuit. This reduces the release of undesired electromagnetic wave caused by a high-frequency signal.

Although, in the above description, the synchronization control unit 40 synchronizes the operation clocks in the same manner as the DLL does, some other methods can be used. Any method can be used as long as the operation clocks of the plurality of the image-output integrated circuits are synchronized when it is performed.

The synchronization control process performed by the image forming apparatus 1 according to the present embodiment is described in detail below. FIG. 5 is a general sequence diagram of the synchronization control process according to the present embodiment. In the example shown in FIG. 5, the image-output integrated circuit 14 is set as the master circuit; the image-output integrated circuit 15 is set as the slave circuit. In the following paragraphs, the image-output integrated circuit 14 is called "master circuit"; the image-output integrated circuit 15 is called "slave circuit". As described above, the synchronization control process is repeated over and over after the image forming apparatus 1 is activated.

The clock generator 41 of the master circuit sends the referential clock to both the comparator 43 of the master circuit and the delay unit 42 of the slave circuit (Steps S501 and S502). The delay unit 42 of the slave circuit selects the operation clock having the delay amount that is currently selected by the selector 52 and sends the selected operation clock to the comparator 43 of the master circuit as the response clock (Step S503).

The comparator 43 then compares the referential clock with the response clock and detects the phase difference between them. The comparator 43 sends the phase difference to the instructor unit 44 of the master circuit (Step S504). The instructor unit 44 of the master circuit sends the phase difference via the phase-difference sending unit 53 to the instructor unit 44 of the slave circuit, thereby instructing the instructor unit 44 of the slave circuit to change the delay amount (Step S505).

The instructor unit 44 of the slave circuit receives the phase difference via the phase-difference receiving unit 54. The instructor unit 44 of the slave circuit instructs, in accordance with the received phase difference, the delay unit 42 of the slave circuit to change the delay element 51 (Step S506). The selector 52 included in the delay unit 42 selects, as a new response clock according to the instruction, the operation clock from clocks received from the delay element 51 so as to eliminate the phase difference and sends the new response clock to the comparator 43 of the master circuit (Step S507).

The clock-phase adjusting process from Steps S501 to S507 is repeated over and over during when the image-output integrated circuits are in operation.

Step S508 and the subsequent steps are the process for adjusting the phase difference larger than the clock cycle. This process is repeated until the phase difference decreases to the clock cycle.

The instructor unit 44 of the master circuit sends the signal to the instructor unit 44 of the slave circuit to request a response to a predetermined pattern (Step S508). The instructor unit 44 of the slave circuit sends the signal of the request to the predetermined pattern (pattern request) to the instructor unit 44 of the master circuit (Step S509).

The instructor unit 44 of the master circuit compares the time of point at which the response is received with the expected time of point at which the response to the sent pattern will be received and determines whether the phase difference is larger than the clock cycle. If the phase difference is larger than the clock cycle, the instructor unit 44 of the master circuit instructs the instructor unit 44 of the slave circuit to change the delay amount so as to eliminate the phase difference (Step S510).

The processes at Steps S511 and S512 are the same as the above-described processes at Steps S506 and S507, respectively; therefore, the same description is not repeated.

As a result of these processes, even if two or more image-output integrated circuits are used, the operation clocks of these image-output integrated circuits are synchronized with each other in a highly accurate manner. The image forming apparatus 1 can output the image data to the engine 16 in the same manner as when a single image-output integrated circuit is used.

An image transfer process for transferring image data from the image-output integrated circuit to the engine 16 is described below with reference to FIG. 6. FIG. 6 is a general sequence of the image transfer process according to the present embodiment.

The CPU 13 (or the higher-level ASIC) instructs the image-output integrated circuits 14 and 15 to start printing (Steps S601 and S602). The engine 16 sends a frame synchronization signal to the image-output integrated circuits 14 and 15 (Steps S603 and S604). The image-output integrated circuit 14 receives the frame synchronization signal via the engine I/F 33 and sends the received frame synchronization signal to the video output controller 34 (Step S605). The image-output integrated circuit 15 performs the same process as in the image-output integrated circuit 14. To make the description simpler, the details are not repeated.

The engine 16 sends a line synchronization signal to the image-output integrated circuits 14 and 15 (Steps S606 and S607). The image-output integrated circuit 14 receives the line synchronization signal via the engine I/F 33 and sends the received line synchronization signal to the video output controller 34 (Step S608).

Upon receiving the line synchronization signal, the video output controller 34 instructs the CPU 13 to transfer the image data (Step S609). The CPU 13 sends the image data to the image-output integrated circuits 14 and 15 in accordance with the instruction (Steps S610 and S611). The image-output integrated circuit 14 receives the image data via the bus I/F 31 and writes the image data to the buffer 32 (Step S612).

The video output controller 34 reads the image data from the buffer 32 (Step S613) and sends the image data to the engine 16 via the engine I/F 33 (Steps S614 and S615). The image-output integrated circuit 15 sends the image data to the engine 16 in the same manner as in the image-output integrated circuit 14 (Step S616).

When the next line synchronization signal is sent from the engine 16, the processes the same as the processes from Steps S606 to S616 are performed (Steps S617 to S627).

As a result of the synchronization control process (see FIG. 5), the image-output integrated circuits 14 and 15 are synchronized with each other in a highly accurate manner. Therefore, even if two or more image-output integrated circuits output a plurality of pieces of image data to the engine 16, due to the processes shown in FIG. 6, the pieces of image data are as highly accurately synchronized as when one image-output integrated circuit outputs the pieces of image data.

As described above, with two or more similar integrated circuit connected to each other, the image forming apparatus according to the present embodiment can operate appropriately in accordance with an increase in the number of colors processed by the engine without a newly designed integrated circuit being necessary. This reduces the designing costs and also shortens the time taken for the designing. Moreover, this enhances the scalability to a change in the number of colors.

Furthermore, as described above, the following effects are present:

1. The integrated circuits are connected to each other with a small number of signal lines.
2. The integrated circuits can be synchronized with each other using a low-frequency signal that is lower than that of the main clock.

According to the embodiments, even if the number of pieces of data to be output increases, the data is output to an external device, such as an engine of an image forming apparatus.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing apparatus, comprising:
a plurality of output circuits that output a plurality of pieces of information to an external device,
wherein each of the output circuits includes:
an operation clock;
a synchronization controller that synchronizes the operation clock of the output circuit with the operation clock of a separate one of the output circuits;
an information receiver that receives a piece of information that is different from a piece of information that is received by the separate output circuit; and
an output controller that outputs the received piece of information from the output circuit to the external device in accordance with the operation clock which has been synchronized such that the received piece of data which is output is output in a synchronized manner with data output from the separate output circuit,
wherein the synchronization controller includes:
a detector that receives the operation clock of the separate output circuit and detects a phase difference between the operation clock of the output circuit and the operation clock of the separate output circuit;
a phase-difference transmitter that sends the detected phase difference to the separate output circuit;
a phase-difference receiver that receives, from the separate output circuit, the phase difference between the operation clock of the output circuit and the operation clock of the separate output circuit;
a delay generator that delays the phase of the operation clock so as to eliminate the received phase difference,
wherein the information receiver of the output circuit receives the piece of information which is information of at least two colors, and
wherein the information receiver of the separate output circuit receives the piece of information of a third color which is different from said at least two colors.

2. The information processing apparatus according to claim 1, wherein the delay generator includes:
a plurality of delay elements that delay the phase of the operation clock so that a plurality of delayed operation clocks that are different in delay amount is produced; and
a selector that selects, from the plurality of the delayed operation clocks, a delayed operation clock to eliminate the received phase difference.

3. An image forming apparatus comprising:
an image forming engine that forms an image on the basis of color image information; and
a plurality of output circuits that output to the image forming engine a plurality of pieces of color information each indicating image information on a different color contained in the color image information, wherein each of the output circuits includes:

an operation clock;

a synchronization controller that synchronizes the operation clock of the output circuit with the operation clock of a separate one of the output circuits;

an information receiver that receives a piece of color information that is different from a piece of color information that is received by the separate output circuit; and an output controller that outputs the received piece of color information from the output circuit to an external device in accordance with the operation clock which has been synchronized such that the received piece of data which is output is output in a synchronized manner with data output from the separate output circuit, wherein the synchronization controller includes:

a detector that receives the operation clock of the separate output circuit and detects a phase difference between the operation clock of the output circuit and the operation clock of the separate output circuit;

a phase-difference transmitter that sends the detected phase difference to the separate output circuit;

a phase-difference receiver that receives, from the separate output circuit, the phase difference between the operation clock of the output circuit and the operation clock of the separate output circuit; and a delay generator that delays the phase of the operation clock so as to eliminate the received phase difference, wherein the information receiver of the output circuit receives the piece of information which is information of at least two colors, and wherein the information receiver of the separate output circuit receives the piece of information of a third color which is different from said at least two colors.

4. An information processing method performed by a plurality of output circuits that output a plurality of pieces of information to an external device, the information processing method comprising:

synchronizing, by a synchronization controller of a first output circuit, a first operation clock of the first output circuit with a second operation clock of a second output circuit;

receiving, by an information receiver of the first output circuit, a plurality of first pieces of information corresponding to different colors and that are different from a second piece of information that is received by the second output circuit and corresponds to a color different from the first pieces of information; and outputting, by an output controller of the first output circuit, the received plurality of first pieces of information to the external device in accordance with the synchronized first operation clock such that the first pieces of information which are output are output in a synchronized manner with the second piece of information, wherein the synchronizing includes:

detecting a phase difference between the first operation clock and the second operation clock;

transmitting the phase difference which has been detected;

receiving the phase difference; and delaying the phase of the first operation clock so as to eliminate the phase difference which has been received.

* * * * *